US009726265B2

(12) United States Patent
Gaffe

(10) Patent No.: US 9,726,265 B2
(45) Date of Patent: Aug. 8, 2017

(54) TRANSMISSION DEVICE FOR CONTROLLING THE TRANSLATIONAL MOVEMENT OF AN ORGAN AND BRAKE SYSTEM EQUIPPED WITH SUCH A TRANSMISSION DEVICE FORMING A BRAKE BOOSTER

(71) Applicant: Robert Bosch GmbH, Stuttgart (DE)

(72) Inventor: Francois Gaffe, La Turballe (FR)

(73) Assignee: ROBERT BOSCH GMBH, Stuttgart (DE)

( * ) Notice: Subject to any disclaimer, the term of this patent is extended or adjusted under 35 U.S.C. 154(b) by 58 days.

(21) Appl. No.: 14/609,393

(22) Filed: Jan. 29, 2015

(65) Prior Publication Data

US 2015/0219191 A1    Aug. 6, 2015

(30) Foreign Application Priority Data

Jan. 31, 2014   (FR) ...................................... 14 50768
Jan. 27, 2015   (FR) ...................................... 15 50621

(51) Int. Cl.
| F16D 55/08 | (2006.01) |
| F16H 19/04 | (2006.01) |
| B60T 13/74 | (2006.01) |
| F16H 25/22 | (2006.01) |
| F16H 25/24 | (2006.01) |

(52) U.S. Cl.
CPC ............ *F16H 19/04* (2013.01); *B60T 13/745* (2013.01); *F16H 25/2252* (2013.01); *F16H 25/2409* (2013.01); *Y10T 74/18808* (2015.01)

(58) Field of Classification Search
CPC ...... F16H 19/04; F16H 1/16; F16H 2035/003; F16H 25/2252; F16H 25/2409; F15B 7/001; F15B 7/08; B60T 11/18; B60T 13/745; Y10T 74/18808
USPC ...... 188/72.8, 72.7, 73.1, 72.1; 60/545, 538, 60/594; 74/424.92
See application file for complete search history.

(56) References Cited

U.S. PATENT DOCUMENTS

| 4,964,314 A * | 10/1990 | Wilkes ................ F16H 25/2252 74/424.92 |
| 9,139,186 B2 * | 9/2015 | Vollert .................. B60T 13/745 |
| 2010/0126167 A1* | 5/2010 | Nagel ................... B60T 13/745 60/545 |

(Continued)

FOREIGN PATENT DOCUMENTS

| DE | 19600518 C1 | 6/1997 |
| DE | 202010017605 U1 | 10/2012 |

*Primary Examiner* — Pamela Rodriguez
(74) *Attorney, Agent, or Firm* — Norton Rose Fulbright US LLP; Gerard Messina

(57) ABSTRACT

A transmission device for controlling the translational movement of an element includes: an exterior planetary gear equipped interiorly with teeth; an interior planetary gear connected to the controlled element and bearing a rack in the direction of translation; a satellite carrier having satellites with helical teeth engaged with the interior teeth; and a stationary housing accommodating the exterior planetary gear, the interior planetary gear, the satellite carrier. The rack is used to control the translational movement of the interior planetary gear. The transmission device is driven by a motor with a transmission acting either on the exterior planetary gear or the satellite carrier.

11 Claims, 5 Drawing Sheets

(56) References Cited

U.S. PATENT DOCUMENTS

2011/0152027 A1* 6/2011 Ohno .................... B60T 13/745
                                                                          475/150
2012/0042647 A1* 2/2012 Vollert ................ B60T 13/745
                                                                          60/545

* cited by examiner

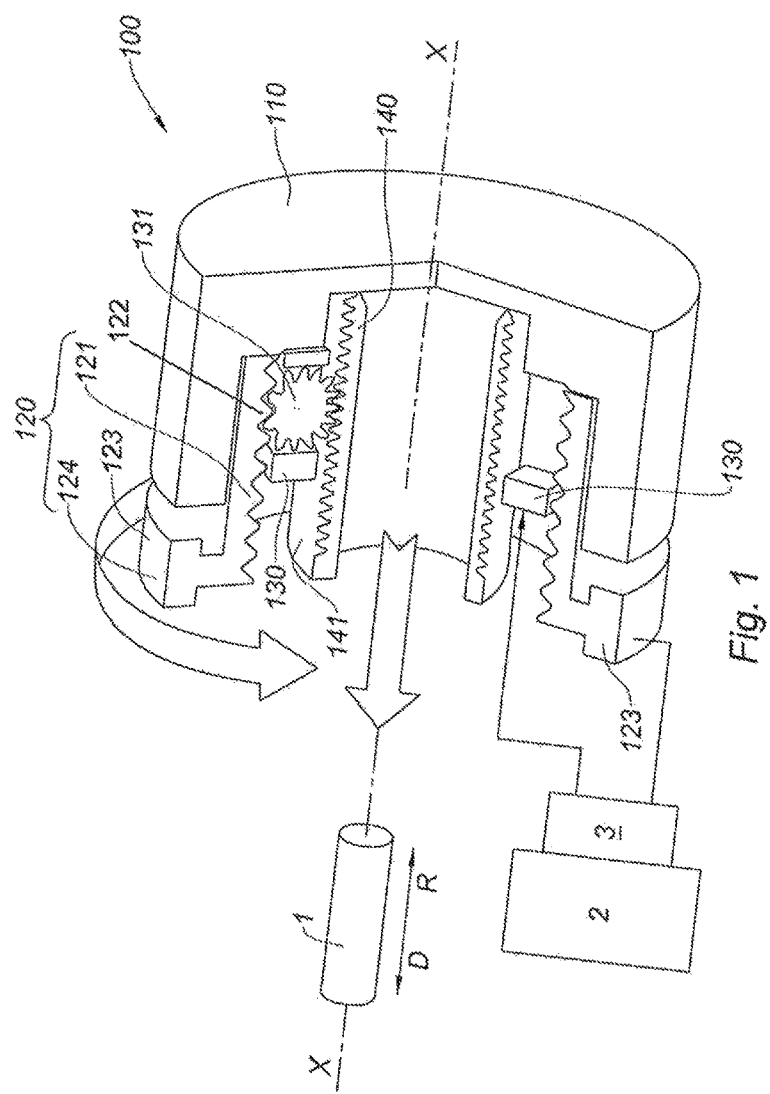

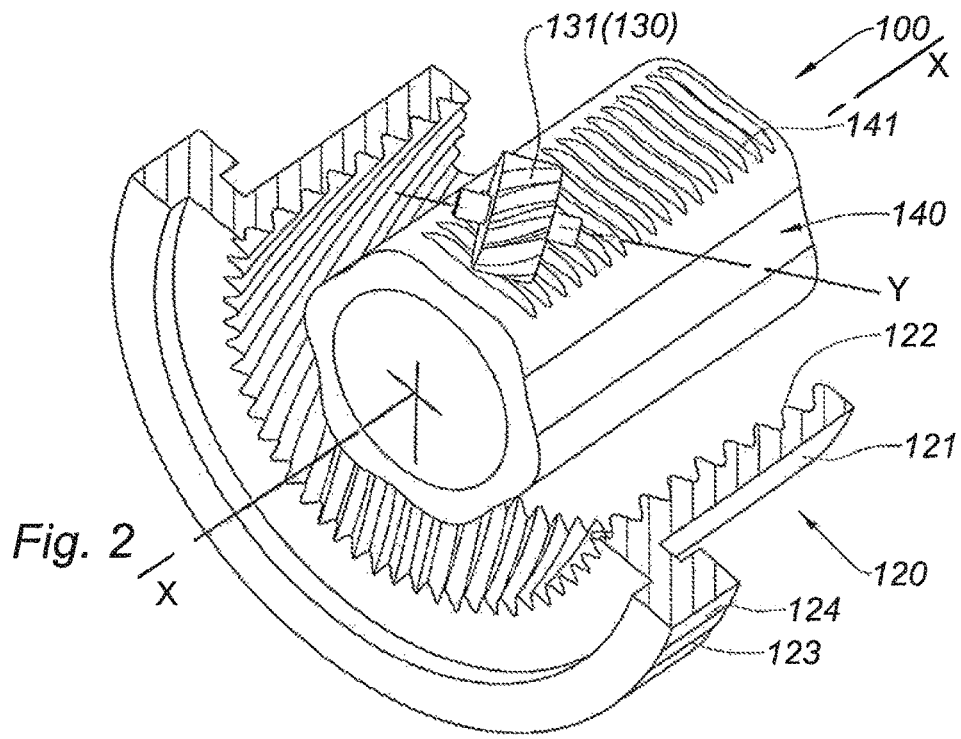
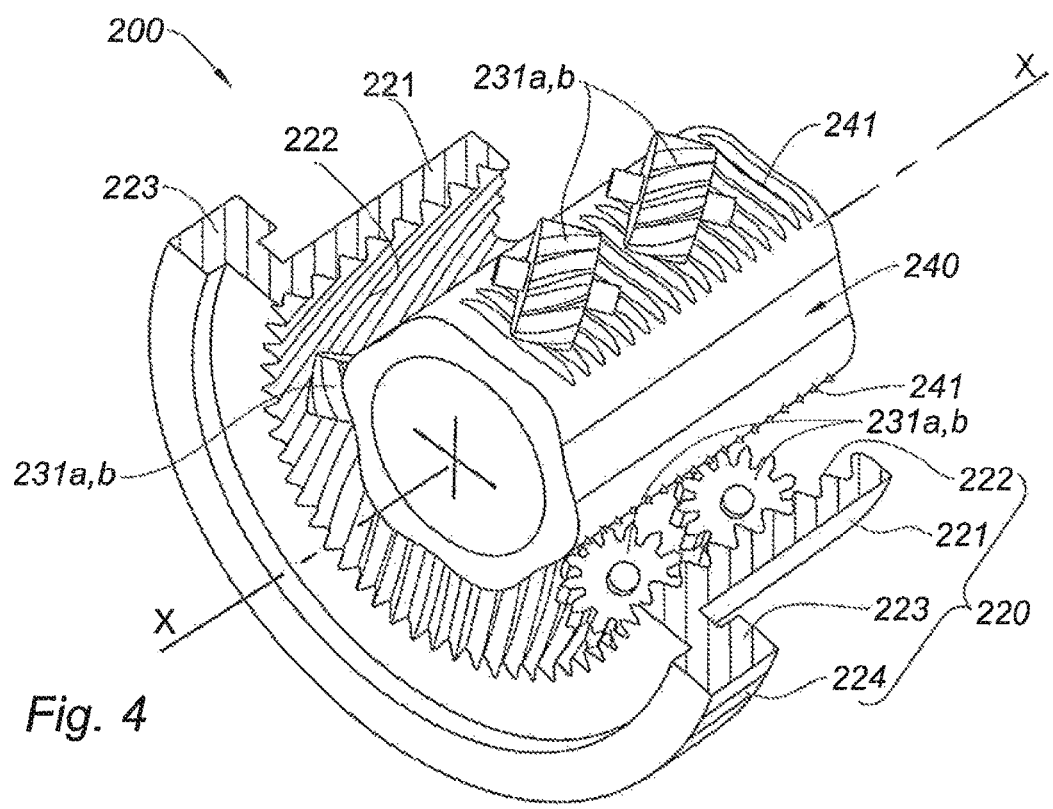

TRANSMISSION DEVICE FOR CONTROLLING THE TRANSLATIONAL MOVEMENT OF AN ORGAN AND BRAKE SYSTEM EQUIPPED WITH SUCH A TRANSMISSION DEVICE FORMING A BRAKE BOOSTER

BACKGROUND OF THE INVENTION

1. Field of the Invention

The present invention relates to a transmission device for controlling the translational movement of an organ and brake system equipped with such a transmission device forming a brake booster.

2. Description of the Related Art

There are multitudes of actuating devices or actuators, especially in the field of braking systems. These actuators, still known as brake boosters, amplify the force exerted by the primary piston of the master cylinder as a function of the brake pedal's activation. These brake boosters are either vacuum assisted or electrically or hydraulically assisted.

Such pneumatic brakes are not suitable for electric or hydride drive vehicles. Electrical brake boosters are bulky.

BRIEF SUMMARY OF THE INVENTION

An object of the present invention is to provide a transmission device for transforming a rotational movement into the translational movement of a controlled object and, in particular, a suitable transmission device, such as the brake booster in a brake system.

To that end, the present invention provides a transmission device for controlling the translational movement of an organ comprising:
a stationary housing accommodating:
  *an exterior planetary gear in the form of a sleeve interiorly equipped with interior helical teeth,
  *an interior planetary gear rotationally fixed and translationally free, connected to the organ and bearing a rack in the direction of translation (xx) of the organ,
  *a satellite carrier(s)
  *wherein the exterior planetary gear or satellite carrier(s) is rotationally driven, whereas the satellite carrier(s) or exterior planetary gear is stationary with respect to the housing;
  characterized in that
  *the satellite carrier(s) is equipped with at least one helical satellite gear interacting with the interior helical teeth and with the rack.

This transmission device has the advantage of being of particularly reduced size, of being composed of a much smaller number of components, and of efficiently transforming a rotational movement into a translational movement, either thrust or traction, or even opposing the force exerted by a spring on the controlled organ.

According to another advantageous characteristic, the satellite has a bowed barrel-like shape and the rack has concave teeth. The bowed shape both of the satellite(s) and the rack(s) enables linear contact at the tangent point to the teeth, which improves the efficiency of transmission and allows for the transmission of much greater forces than with straight teeth with local contact, so that we can, depending upon the conditions of use, realize the transmission using satellites of a plastic material, which simplifies the manufacturing process and reduces cost considerably.

According to another advantageous characteristic, the satellite carrier is equipped with groups of three satellites uniformly distributed along the periphery, and the interior planetary gear is equipped with at least three racks oriented along the axis of translation (xx) to cooperate with the satellites.

The multiplication of satellite groups and, in particular, of three satellites per group, allows us to reduce the forces exerted on each satellite and thereby simplify the manufacturing process through the use of plastic materials for realizing satellites and, when appropriate, the satellite carrier.

In the simplest case, the satellite carrier(s) has only one satellite or a tandem satellite. But in general, for reasons of symmetry, it is advantageous to have a satellite carrier(s) equipped with at least three satellites or three pairs of satellites cooperating with a rack in one or more portions realized on the interior planetary gear.

According to another advantageous characteristic, the satellite carrier(s) is equipped with tandem satellites.

According to another characteristic, the crown of the exterior planetary gear is equipped with drive teeth, which enables the use of a large diameter pinion, which is attacked by the outlet of the motor driving the transmission device, thereby constituting a reducer directly on the transmission device.

According to another characteristic, the interior planetary gear has at least one rack along a flattened longitudinal band. The cross-section of the interior planetary gear, preferably of tubular shape, is externally a polygonal section some of whose segments correspond to a flattened longitudinal band in which a rack is realized. The number of flattened longitudinal bands with a rack advantageously corresponds to the number of satellites on the satellite carrier(s).

However, the rack may also be realized along the entire peripheral surface of the interior planetary gear and, in this case, this peripheral surface is cylindrical with a circular section, so that the satellites can turn around the interior planetary gear, the initiation of movement occurring through the satellite carrier(s), the exterior planetary gear remaining stationary under these conditions.

Another object of the invention is a braking system comprising a master cylinder and a brake booster, the brake booster being a transmission device for controlling the translational movement of an organ comprising:
a stationary housing accommodating:
  *an exterior planetary gear in the form of a sleeve interiorly equipped with interior helical teeth,
  *an interior planetary gear rotationally fixed and translationally free, connected to the organ and bearing a rack in the direction of translation (xx) of the organ,
  *a satellite carrier(s) equipped with at least one helical satellite gear interacting with the interior helical teeth and with the rack,
  *wherein the exterior planetary gear or satellite carrier(s) is rotationally driven, whereas the satellite carrier(s) or exterior planetary gear is stationary with respect to the housing,
a control rod connected to the brake pedal and a piston acting on a reaction disk in parallel with an intermediary piston subject to the thrust of the interior planetary gear and transmitting the thrust movement to the primary piston of the master cylinder,
a motor engaged through a transmission with the exterior teeth of the crown of the exterior planetary gear.

This braking system has the advantage of being compact with respect to the brake booster combined with the master cylinder.

BRIEF DESCRIPTION OF THE DRAWINGS

FIG. 1 is an isometric cutaway of a first embodiment of a transmission device.

FIG. 2 is a simplified isometric view of the transmission device of FIG. 1.

FIG. 4 is a simplified isometric view of the transmission device of FIG. 3.

DETAILED DESCRIPTION OF THE INVENTION

Figure 3:
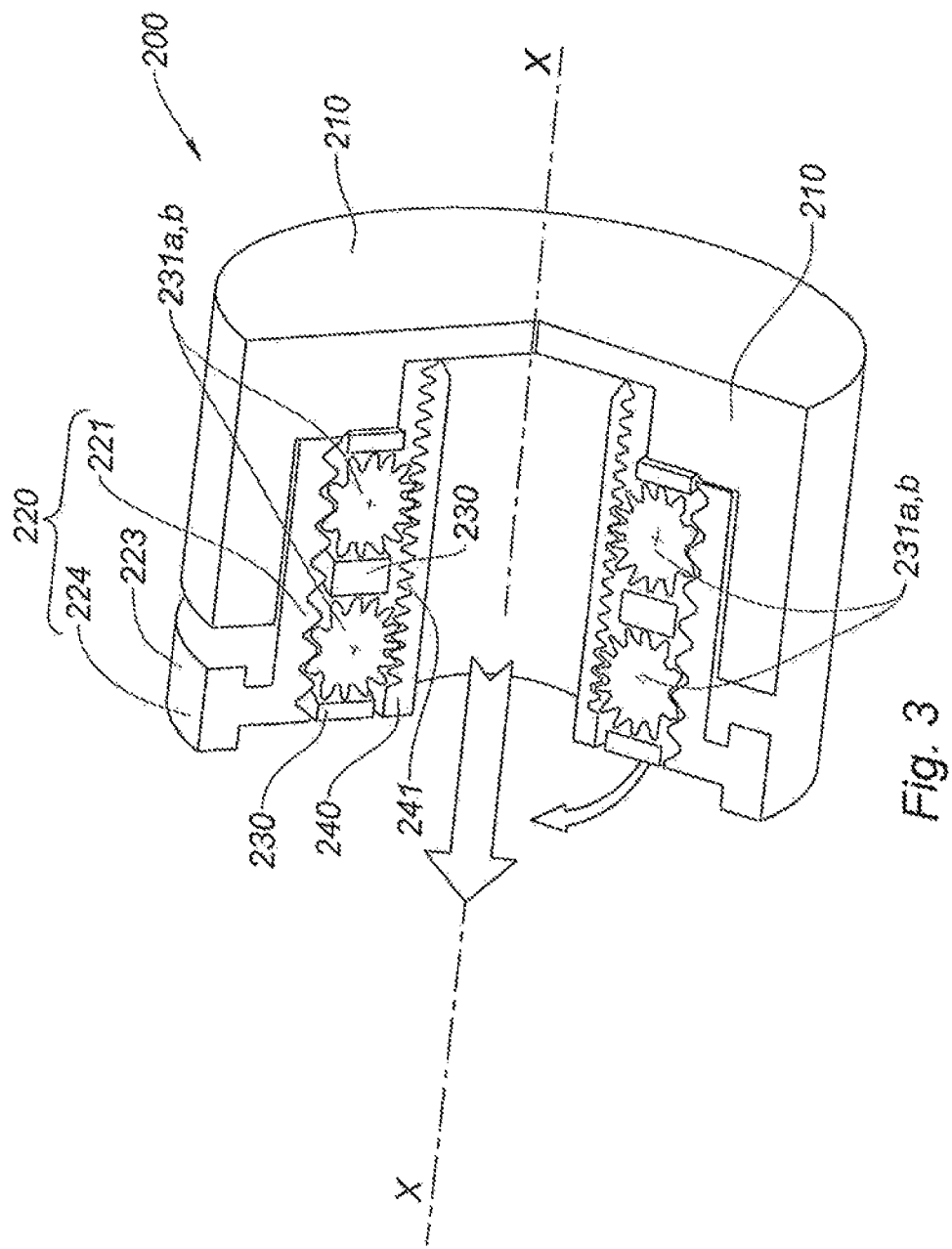
FIG. 3 is an isometric cutaway of another embodiment of a transmission device.

According to FIG. 1, the object of the invention is transmission device 100 intended to control the translational movement of organ 1 along the (xx) direction, in a sense (D) or in the reverse sense (R).

Device 100 consists of stationary housing 110, which houses the transmission mechanism formed by exterior planetary gear 120, interior planetary gear 140, and satellite carrier(s) 130. Exterior planetary gear 120 is in the form of sleeve 121 equipped with exterior crown 123. Planetary gear 120 is fixed in translation (direction xx) and rotationally free. It has helical interior teeth 122.

Interior planetary gear 140, rotationally fixed, is free in translation (direction xx). This interior planetary gear 140, in the shape of a tube, is connected to the controlled organ (1); it has rack 141 in the direction of translation (xx) of controlled organ 1.

Satellite carrier(s) 130 is equipped with at least one satellite 131 with helical teeth. This satellite, 131, interposed between exterior planetary gear 120 and interior planetary gear 140, engages with interior helical teeth 122 and with rack 141.

Exterior planetary gear 120 [or satellite carrier(s) 130] is rotationally driven while the other element, namely satellite carrier(s) 130 [or exterior planetary gear 120] is fixed with respect to housing 110. This rotational movement generates the translational movement of interior planetary gear 140, which pushes or pulls controlled organ 1 depending on the direction of rotation applied to exterior planetary gear 120 or to satellite carrier(s) 130.

Exterior planetary gear 120 or satellite carrier(s) 130 is rotationally driven by motor 2.

In the case where exterior planetary gear 120 is rotationally driven, crown 123 has teeth, which are engaged with the output of motor 2, either directly or by means of a transmission (3), for example a reducer. In this case, satellite carrier(s) 130 is rotationally blocked in such a way that satellite(s) 131 is (are) moved by engagement with rack 141 of interior planetary gear 140 along a line parallel to the direction of translation (xx). Rack 141 may consist of a band occupying a fraction of the periphery of interior planetary gear 140. Interior planetary gear 140 possesses as many bands in the shape of rack 141 as there are satellites 131 on satellite carrier(s) 130.

When exterior planetary gear 120 is stationary and satellite carrier(s) 130 is rotationally driven, this satellite carrier(s) (130) has a crown, 123, whose teeth (not shown) are driven by motor 2. In this embodiment, rack 141 of interior planetary gear 140 occupies the entire periphery of interior planetary gear 140.

FIG. 2 is a simplified isometric view of transmission device 100 of FIG. 1 showing exterior planetary gear 120 in the shape of sleeve 121 with, at its extremity, crown 123, which may have teeth. These teeth are not shown. The figure shows interior helical teeth 122 of sleeve 121 of exterior planetary gear 120. Interior planetary gear 140 is equipped with straight rack 141 oriented in the direction of translation (xx). In this embodiment, satellite carrier(s) 130 is fixed in rotation and exterior planetary gear 120 is rotationally driven. Interior planetary gear 140 has only one rack 141, extending over a longitudinal band of its exterior surface, flattened for that purpose.

Satellite carrier(s) 130 is not shown. Only satellite 131 with helical teeth is shown, whose slope corresponds to the relative slope of the helical teeth 122 of exterior planetary gear 120 and the straight teeth of rack 141 of interior planetary gear 140.

The teeth of the epicyclic mechanism formed by exterior planetary gear 120, satellite carrier(s) 130 with its satellite(s) 131, and interior planetary gear 140 with its rack 141 form a self-locking mechanism in that only the relative rotation of exterior planetary gear 120 or of satellite carrier(s) 130 relative to interior planetary gear 140 (the other of the two elements being stationary) generates a translational movement of interior planetary gear 140 in one sense (D) or the other (R) along direction (xx).

In transmission device 100 according to the invention, as described above and elsewhere in the other embodiments described below, the helical teeth of satellite (or satellites) 130 are helical teeth with axis (yy), which is that of the satellite. This axis is inclined with respect to axis (xx) of rack 141 so that, upon contact, each tooth of satellite 131 is engaged and the tooth of rack 141 is tangent.

In the case of a rack with straight teeth oriented perpendicularly to direction (xx) or the axis of rack 141, as is generally the case, and a satellite whose teeth have a slope (a) with respect to axis (yy) of satellite 131, this axis of the satellite will be inclined to the (xx) axis of rack 141 by the complement (90°-alpha) to axis (xx).

FIGS. 3 and 4 illustrate a second embodiment of transmission device 200 according to the invention. In describing this embodiment, we will use the same references used in the first embodiment, increased by 100. This device, 200, is distinguished from the previous device in that the satellite carrier(s) 230 is equipped with tandem satellites 231a,b. For example, it is also equipped with three pairs of satellites 231a,b distributed in equiangular manner. Satellites 231a,b mesh with rack 241 of interior planetary gear 240 and with interior helical teeth 222 of exterior planetary gear 220.

Rack 241 consists, in this case, of three racks in the form of flattened bands aligned along the direction of movement (D) of interior planetary gear 240. This embodiment is not necessary. Rack 241 can also extend along the entire periphery of the interior planetary gear.

This embodiment 200, like the previous one, enables exterior planetary gear 220 to drive the mechanism while satellite carrier(s) 230 remains stationary. In this case, exterior planetary gear 220 is equipped with toothed crown 223 cooperating with the output of motor 2 through a direct connection or by means of transmission 3, in particular, a reducer.

According to another embodiment and method of operation, this transmission device has stationary exterior planetary gear 220 and mobile satellite carrier(s) 230, which is rotationally mobile and fixed in translation. Rack 241 of interior planetary gear 240 extends over its entire periphery.

FIG. 4 is a simplified isometric view, which like FIG. 2, shows exterior planetary gear 220 with its interior helical teeth 222 and drive gear 223. The teeth of drive gear 223 are not shown.

This figure shows the three pairs of satellites 231*a,b* in the satellite carrier(s). These satellite pairs are distributed equi-angularly and satellites 231*a,b* are oriented in the same direction.

Figure 5:
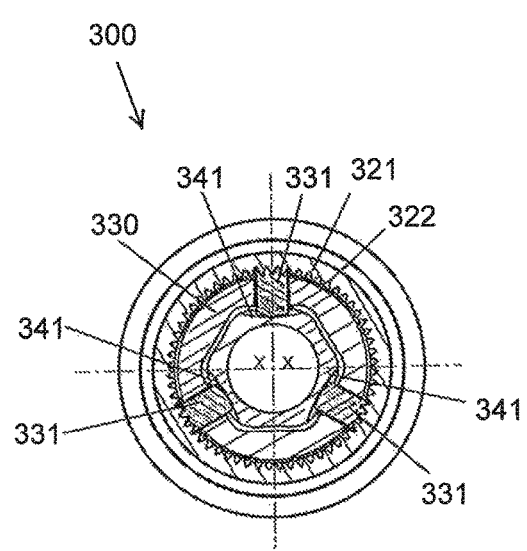
FIG. 5 is a simplified perpendicular cutaway along the (xx) axis of a variant of the transmission device.

In the different embodiments shown in FIGS. 2, 4, and 5, interior planetary gear 140, 240 is represented with racks in the shape of bands occupying flattened bands of interior planetary gear 140, 240, which thereby has an exterior polygonal section, while its interior section may be circular, as shown in the figures.

Figure 7:
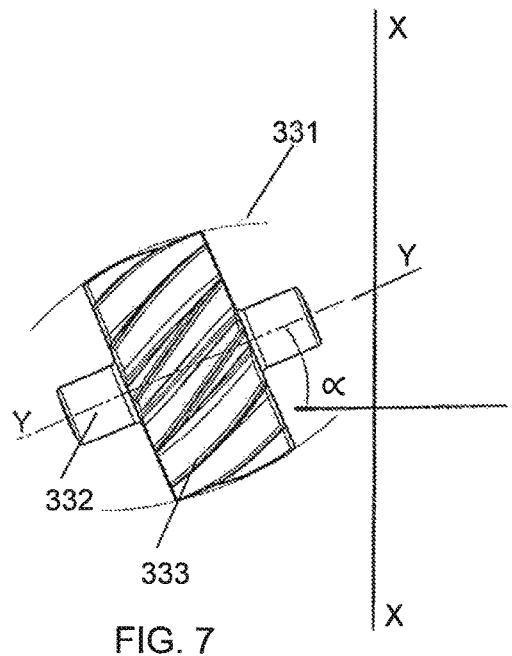
FIG. 7 is a side view of a satellite of the transmission device according to FIG. 5.
Figure 6:
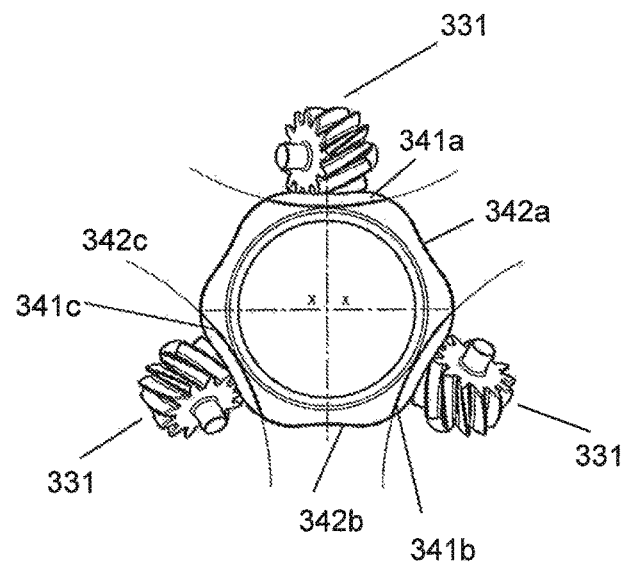
FIG. 6 is a front view of the interior planetary gear and three satellites engaged with it.

FIGS. 5 to 7 show a variant transmission device 300 according to the invention. The cutaway view of FIG. 5 shows device 300 with axis (xx) perpendicular to the plane of the figure; it consists of exterior planetary gear 320, analogous to the previous, formed by sleeve 321 with interior teeth 322 and interior planetary gear 340, equipped with one or more racks 341*a,b,c*. Planetary gears 320, 340 receive satellite carrier 330, equipped with satellites 332, engaged with teeth 321 of exterior planetary gear 320 and with rack 341 of interior planetary gear 340. Interior planetary gear 340 has a hexagonal section overall, with three racks 341*a,b,c* in the shape of longitudinal bands along axis (xx), distributed uniformly along the periphery at an angle of 120°, by placing between them bands 342*a,b,c*, which can also be racks.

The teeth of racks 341*a,b,c* are oriented transversely and have a curved shape (hourglass shape) as emphasized by the arc in the drawing extending the bottom of each tooth in FIG. 6.

Satellites 331, which cooperate with racks 341*a,b,c*, have a bowed or barrel shape, homologous to that of the teeth of racks 341*a,b,c*, so as to increase contact and replace the quasi-local contact of strictly helical teeth on the satellite with linear contact through the use of this bowed shape.

FIG. 7 shows a side view of satellite 331. It has axis 332 along geometric axis (yy) and a pinion equipped with bowed helical teeth 333. These teeth have a slope (alpha) such that satellite 331 is installed in satellite carrier 330 with an orientation to the (xx) axis of rack 341 (341*a,b,c*) corresponding to the complement of slope (alpha) so as to have tangential contact between each tooth 333 of satellite carrier 331 and the teeth of rack 341*a,b,c*. This inclination of the axes (yy) of satellites 331 with respect to the (xx) direction of racks 341*a,b,c* is shown in FIG. 6 but it is not visible in the cutaway view of FIG. 5.

As indicated above, we can increase the number of satellites, for example, having two groups of three satellites in the transverse plane, as in FIG. 6, to reduce the force applied to each satellite and enable them to be made of plastic material to reduce costs.

We can also couple the satellite groups in series to increase the axial force exerted.

Figure 8:
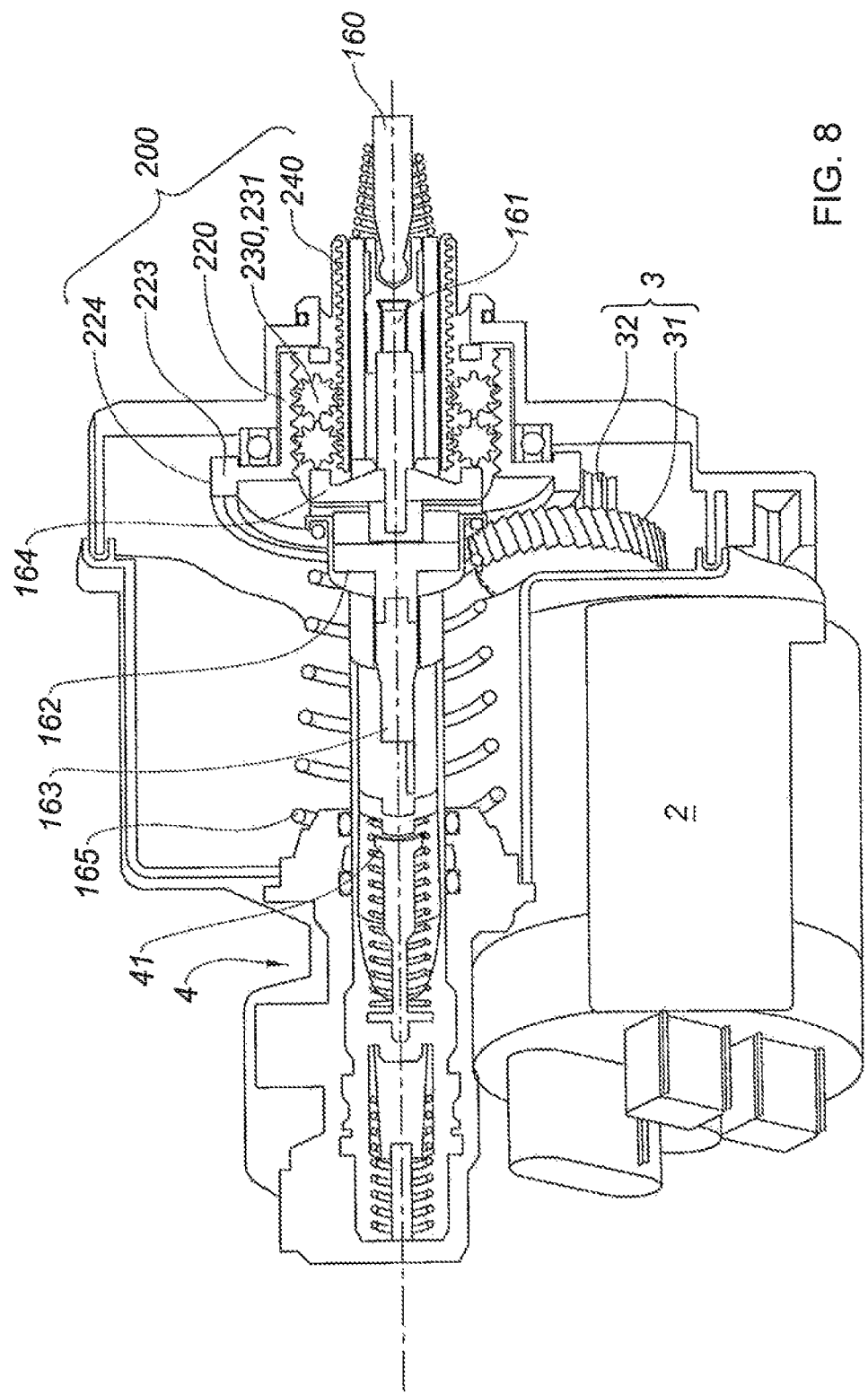
FIG. 8 is a cutaway isometric view of a brake booster equipped with a transmission device according to the invention.

FIG. 8 illustrates an application of the transmission device described above in its various versions.

Transmission device 200, given as an example but not described in detail, is combined with a brake system whose single tandem master cylinder 4 is shown. The transmission device according to the invention thereby constitutes an electromechanical brake booster driven by motor 2, whose output drives, through a reducer formed by pinions 31 and small pinion 32, teeth 224 of crown 223 of exterior planetary gear 220. This mechanism receives, through interior planetary gear 240, control rod 160 arriving from the brake pedal and the organ of transmission and brake pedal and control rod 160 thrust detection. The connection is continued by plunger piston 161 for detecting the movement of control rod 160 and, thus, detection of the braking request by the driver, in order to activate the brake booster, that is, motor 2 and transmission device 200. Plunger piston 161 acts on reaction disk 162, which itself solicits push rod 163. This latter pushes primary piston 41 of tandem master cylinder 4. Push rod 163 is displaced in the direction of compression of master cylinder 4 by intermediary piston 164, connected to exterior planetary gear 220.

Intermediary piston 164 is traversed by plunger piston 161, which can thus directly push reaction device 162 to actuate master cylinder 4 in the event of a failure of the brake booster (200, 2).

Return spring 165 pushes intermediary piston 165 against crown 223 of exterior planetary gear 220.

REFERENCE KEY

1 Controlled organ
2 Engine
3 Transmission
4 Master cylinder
31,32 Pinions
100 Transmission device
110 Stationary housing
120 Exterior planetary gear
121 Sleeve
122 Interior teeth
123 Crown
130 Satellite carrier(s)
131 Satellite
140 Interior planetary gear
141 Rack
160 Control rod
200,300 Transmission device
210,310 Stationary housing
220,320 Exterior planetary gear
221,321 Sleeve
222,322 Interior teeth
223,323 Crown
224,324 Crown teeth
230,330 Satellite carrier(s)
231*a,b* 331*a,b,c* Satellites/tandem satellites
332 Satellite axis
333 Satellite tooth
240,340 Interior planetary gear
241,341 Rack
xx Rack axis
yy Genetic axis of satellite

The invention claimed is:

1. A transmission device for controlling a translational movement of an element, comprising:
   an exterior planetary gear in the form of a sleeve having interior helical teeth;
   an interior planetary gear which is rotationally fixed and translationally free, connected to the element and having at least one rack in the direction of translation of the element;
   a satellite carrier; and a stationary housing accommodating the exterior planetary gear, the interior planetary gear, and the at least one satellite carrier;

wherein the satellite carrier is rotationally driven, and wherein the exterior planetary gear is stationary with respect to the housing, and wherein the satellite carrier is provided with at least one helical satellite gear interacting with the interior helical teeth and the rack.

2. The transmission device according to claim 1, wherein the at least one helical satellite gear has a bowed barrel-like shape and the rack has concave teeth.

3. The transmission device of claim 2, wherein the at least one helical satellite gear has a pinion equipped with helical teeth that have a slope such that the at least one helical satellite gear is situated in the satellite carrier with an orientation to a longitudinal axis of the rack corresponding to a complement of the slope.

4. The transmission device according to claim 1, wherein the satellite carrier is provided with tandem satellites.

5. The transmission device according to claim 1, wherein a crown of the exterior planetary gear is provided with drive teeth.

6. The transmission device according to claim 1, wherein the interior planetary gear has the at least one rack along a flattened longitudinal band.

7. A transmission device for controlling a translational movement of an element, comprising:
an exterior planetary gear in the form of a sleeve having interior helical teeth;
an interior planetary gear which is rotationally fixed and translationally free, connected to the element;
a satellite carrier, wherein the satellite carrier is provided with groups of three satellite gears uniformly arranged along the periphery, and the interior planetary gear is provided with at least three racks oriented along an axis of translation, in a direction of translation of the element, to cooperate with the satellite gears; and
a stationary housing accommodating the exterior planetary gear, the interior planetary gear, and the at least one satellite carrier;
wherein one of the exterior planetary gear or the satellite carrier is rotationally driven, and wherein the one of the satellite carrier or the exterior planetary gear is stationary with respect to the housing, and wherein the satellite carrier is provided with at least one helical satellite gear interacting with the interior helical teeth and the rack.

8. A brake system comprising:
a master cylinder; and
a brake booster which is a transmission device for controlling the translational movement of an element, the transmission device including:
an exterior planetary gear in the form of a sleeve having interior helical teeth, wherein a crown of the exterior planetary gear is provided with drive teeth;
an interior planetary gear which is rotationally fixed and translationally free, connected to the element and having at least one rack in the direction of translation of the element;
a satellite carrier; and
a stationary housing accommodating the exterior planetary gear, the interior planetary gear, and the at least one satellite carrier;
wherein the satellite carrier is rotationally driven, and wherein the exterior planetary gear is stationary with respect to the housing;

a control rod connected to a brake pedal;
a piston acting on a reaction disk in parallel with an intermediary piston subject to a thrust of the interior planetary gear and transmitting the thrust movement to a primary piston of the master cylinder; and
a motor engaged by a transmission with exterior teeth of the crown of the exterior planetary gear.

9. A brake booster, comprising:
an exterior planetary gear in the form of a sleeve having interior helical teeth, wherein a crown of the exterior planetary gear is provided with drive teeth;
an interior planetary gear which is rotationally fixed and translationally free, connected to an element and having at least one rack in a direction of translation of the element;
a satellite carrier; and
a stationary housing accommodating the exterior planetary gear, the interior planetary gear, and the satellite carrier;
wherein the satellite carrier is rotationally driven, and wherein the exterior planetary gear is stationary with respect to the housing.

10. A brake booster, comprising:
an exterior planetary gear in the form of a sleeve having interior helical teeth, wherein a crown of the exterior planetary gear is provided with drive teeth;
an interior planetary gear which is rotationally fixed and translationally free, connected to an element and having at least one rack in a direction of translation of the element;
a satellite carrier; and
a stationary housing accommodating the exterior planetary gear, the interior planetary gear, and the satellite carrier;
wherein one of the exterior planetary gear or the satellite carrier is rotationally driven, and wherein one of the satellite carrier or the exterior planetary gear is stationary with respect to the housing, and
wherein the satellite carrier is provided with at least one helical satellite gear interacting with the interior helical teeth and the rack, and wherein the at least one helical satellite gear has a pinion equipped with helical teeth that have a slope such that the at least one helical satellite gear is situated in the satellite carrier with an orientation to a longitudinal axis of the rack corresponding to a complement of the slope.

11. A brake booster, comprising:
an exterior planetary gear in the form of a sleeve having interior helical teeth, wherein a crown of the exterior planetary gear is provided with drive teeth;
an interior planetary gear which is rotationally fixed and translationally free, connected to an element and having at least one rack in a direction of translation of the element;
a satellite carrier; and
a stationary housing accommodating the exterior planetary gear, the interior planetary gear, and the satellite carrier;
wherein one of the exterior planetary gear or the satellite carrier is rotationally driven, and wherein one of the satellite carrier or the exterior planetary gear is stationary with respect to the housing, and
wherein the satellite carrier is provided with groups of three satellite gears uniformly arranged along a periphery, and the interior planetary gear is provided with at least three racks oriented along an axis of translation, in the direction of translation of the element, to cooperate with the satellite gears.

* * * * *